May 10, 1932.  M. H. LOUGHRIDGE  1,857,760
ELECTRIC RAILWAY SYSTEM
Filed Feb. 14, 1927   3 Sheets-Sheet 1

Inventor,
Matthew H. Loughridge

May 10, 1932.  M. H. LOUGHRIDGE  1,857,760
ELECTRIC RAILWAY SYSTEM
Filed Feb. 14, 1927  3 Sheets-Sheet 3
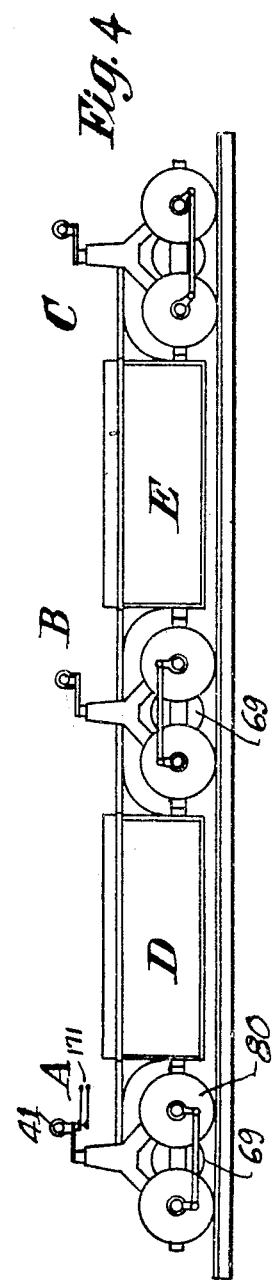
INVENTOR.
Matthew H. Loughridge
BY
ATTORNEY.

Patented May 10, 1932

1,857,760

UNITED STATES PATENT OFFICE

MATTHEW H. LOUGHRIDGE, OF BOGOTA, NEW JERSEY

ELECTRIC RAILWAY SYSTEM

Application filed February 14, 1927. Serial No. 168,189.

This invention relates to railway systems and has certain features that are peculiar to electric railways, other features that are peculiar to railroads operated automatically and still other features that are of general application in the art of railroading or the transportation of freight.

The objects of this invention are to provide an improved system of unit trucks, power operated and co-operatively connected, a system of series-multiple control automatically operated and means on the track for automatically controlling the running direction of the trains.

This invention embodies a block system which automatically secures the spacing of cars or trains on the track which is described in U. S. Patent 1,617,402, issued Feb. 15, 1927.

This invention contemplates a railway construction in which the car trucks are separate from the car bodies and through the car bodies these trucks may be coupled into a train. The trucks are provided with electric motors for propulsion purpose and each truck is a universal unit capable of operating alone or of being coupled with other trucks, and when so coupled the motors of the coupled trucks may be operated in series or in multiple. A centrifuge is provided for automatically controlling the series-multiple operation of the propulsion motors according to the speed of the train. The running direction of the motors may be remotely controlled for the direction of running desired.

The trucks are provided with a braking system automatically operated by the propulsion motors, as fully described in U. S. Patent 1,805,551, issued May 19, 1931.

These objects are more particularly described in the following specification and the operation of the invention will be understood by reference to the accompanying drawings illustrating the several features of the invention in detail.

Drawings

Fig. 4 shows a coupled two car train using unit trucks.

The track layout

Figure 1:
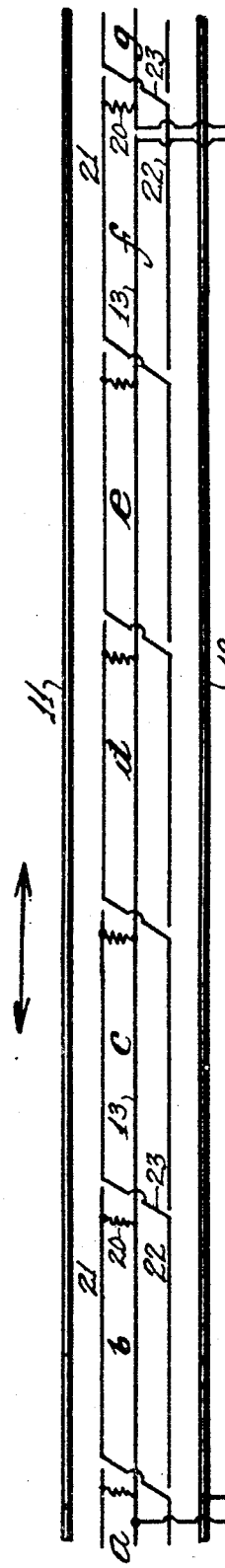
Fig. 1 is a track layout showing the application of the block system.

In Fig. 1, the track rails are 11 and 12. The power wire, which is preferably located centrally between the rails and over the cars, is indicated by 13. This power wire is connected with a D. C. generator 16 through the pole changing switch 17 by wire 18 and the return circuit is obtained by wire 19 connecting to rail 12.

The track is divided into blocks as indicated by the letters $a$ to $g$ which blocks are determined by the wires 21 and 22. Wire 21 is energized through a resistance 20 from the power wire 13 and at the end of each block these wires 21 and 22 are connected by the jumper 23. A train running, for instance to the right, requires wire 22 to be energized and if no train is in the succeeding block this wire will be energized through the resistance 20, but if a train in the succeeding block grounds wire 21, this practically deenergizes 22 in the block in the rear and causes the following train to stop until the succeeding block has been cleared.

The length of the blocks may be determined by the jumper 22 without materially adding to the cost.

As shown in the drawings the power wire 13 and the block wires 21 and 22 may be supported by an overhead construction to engage trolleys on the top of the trucks; however, any other location may be used for these conductors. These conductors are herein referred to as located on the trackway which term is intended to include any location on the right of way.

The speed of the train can be regulated by the voltage on the power wire, or by the frequency of the power system where alternating current is used. For example, the resistance 14, which is adjustable, is interposed on the power wire between blocks $f$ and $g$, causing a voltage drop on the section *g* and thereby reducing the speed of the train.

The truck wiring

Figure 3:
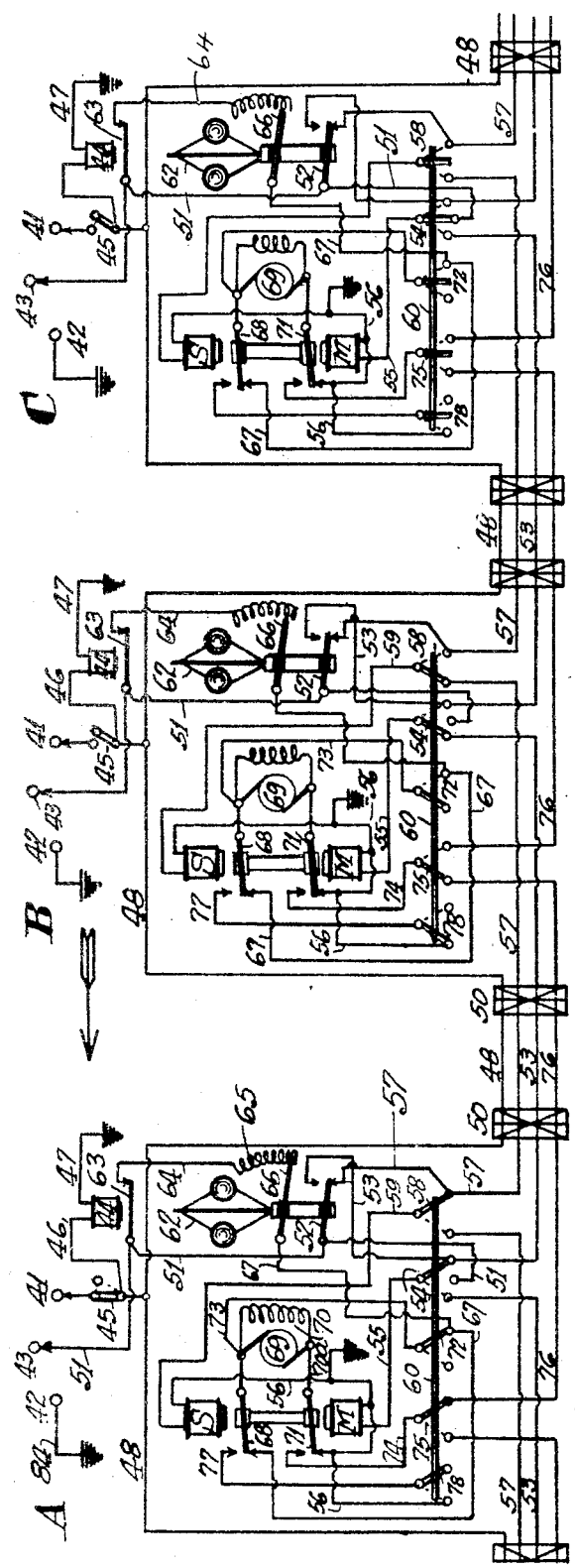
Fig. 3 is a developed wiring diagram of three coupled trucks forming a train.

Fig. 3 shows the wiring arrangement for trucks A, B and C coupled into a train. The wiring of each truck is identical and similar reference characters are used to designate similar parts. The trolley contacts 41 and 42 engage the block wires 22 and 21 and the trolley contact 43 engages the power wire. The block relay 44 is grounded on one side by wire 47 and on the other side connects by wire 46 and switch 45 with the trolley 41. The trolley 42 is grounded by wire 84. When the trolley 41 engages block wire 22 and this wire is energized, the block relay will be energized establishing running conditions. On the other hand, when the block wire 22 is deenergized, the block relay is deenergized disconnecting the power from the motors and applying the brakes as hereinafter described. When the trolley 42 engages block wire 21, this wire is grounded, thus deenergizing the block wire 22 in the rear block and thereby stopping a following train. As shown in Figs. 1 and 3 the block system operates on the closed circuit plan, but as described in U. S. Patent 1,617,402, dated Feb. 15, 1927, the same principles can be applied to a block system operating on the open circuit plan.

It is necessary that the block system be operated from one point on the train as for instance on the leading car or truck. As shown in Fig. 3, the trolley 41 on car A controls the block relays on the other cars. On truck A the switch 45 is closed and a circuit is established in multiple with the block relay 44 to wire 48, which, through the couplers 50 passes from car to car through the train connecting with wire 46 on each truck thus placing all the block relays in multiple circuit on the block wire controlled by the trolley 41 on the leading car only. On the following trucks, it will be noted that switch 45 on each truck is opened manually when the trucks are coupled into a train; this switch therefore, determines the truck from which the block control is made effective.

A master controller on each truck controls the operation of the driving motor. When this controller is in one position the driving motor is directly connected in multiple circuit to the power wire, and when the controller is in the opposite position, the motor is connected in series with the motor of an adjoining truck. The master controller is indicated by M—S. When the magnet M is energized the condition of multiple control is established and when the magnet S is energized the condition of series control is established.

The master controller is directly operated from the power wire by the centrifuge 62 through wire 51, contact 52 of the centrifuge and with the truck at rest or traveling below a predetermined speed, through wire 57, switch 58, and wire 59 to magnet S and from there to ground on common wire 56. With the controlling switches 60 in cars A and B in the position shown, the circuit through wire 57 is also continued through the couplers 50 to switch 58 on truck B and by wire 59 to magnet S and to ground on wire 56. The S magnets of the master controller on trucks A and B are thus controlled in multiple circuit by the centrifuge 62 on truck A. The control by the centrifuge on truck B, it will be noted, is disconnected at switches 58 and 54 from trucks A and C.

When magnet S is energized the contact fingers 68 and 71 of the master controller change to the reverse position from that shown. Under these conditions the motor is operated from the power wire 51, through contact 63 of the block relay energized, wire 64, resistance 65 varied by the contact finger 66 of the centrifuge 62, wire 67, switch 72 and wire 73 to the terminal of motor 69. The circuit is continued from the opposite terminal of the motor through wire 70a, contact finger 71, wire 74, switch 75 and wire 76 to switch 75 on truck B. On this truck the circuit is continued through wire 74, contact finger 71, motor 69, contact finger 68, wire 77, switch 78 and wire 56 to ground. Thus at starting or under a predetermined low speed, the S magnets of the adjacent trucks are energized in multiple circuit and are controlled by the centrifuge on one truck. Energizing these magnets places the motors on these trucks A and B in series circuit and their operating current is controlled by the block relay and by the centrifuge which operates the master controller. Truck C with the controlling switch 60 in the neutral position operates by itself and is regulated by its own centrifuge.

With the switches 60 in the position shown in trucks A and B and the centrifuge exceeding a predetermined speed, the circuit of the S magnets is interrupted and the circuit of the M magnets is established. The contact finger 52 of the centrifuge interrupts the connection to wire 57 and establishes connection with wire 53 where the circuit is continued through switch 54, and wire 55 to magnet M and to ground on wire 56. The circuit of wire 53 is also continued through the couplers 50 to the truck B and through switch 54 and wire 55 energizes magnet M on truck B in multiple circuit with magnet M on truck A. Thus when a predetermined speed is exceeded, magnets M on trucks A and B are energized under the control of the centrifuge 62 on truck A. In order to make the circuits on each car uniform the motor 69 is controlled by two circuits, one of which includes wire 73 and the other includes wire 67 and contact 68, leading from the power supply wire 64. On truck A as shown in Fig. 3 the motor is energized through 73 and 67—68 in multiple. On truck B wire 73 is on open circuit at switch 72 and the motor is energized through 67 and 68 only. The same conditions are established on truck C. It is apparent that when magnet S on truck A is energized the circuit of wire 67 is interrupted at 68 and the motor is energized only by wire 73; also, on truck B when magnet S is energized the circuit of 67 is interrupted at 68.

When magnet M is energized the master controller is in the position shown. On truck A the power to the motor is controlled by the block relay 44, wire 64, resistance 65, centrifuge contact 66, wire 67, contact finger 68, motor 69, contact finger 71, and wire 56 to ground. The motor on truck B is controlled by a similar circuit, having similar reference characters and controlled by the block relay 44 and the centrifuge 62 on truck B. It will thus be observed that when the motors are operating in series the master controllers are controlled in multiple circuit by one centrifuge and the current to the coupled motors is controlled by one centrifuge. When the motors are operating in multiple, the master controllers are connected in multiple circuit and are controlled by one centrifuge while the current to each motor is controlled independently by its own block relay and centrifuge. It should be noted that the motors in both series and multiple operation are always controlled by their own master controller. The block relays 44 are energized by wire 48 from the leading car as hereinbefore referred to.

The arrangement described has been directed to trucks A and B which, it will be noted, are exactly alike as to apparatus and wiring and are coupled to operate in series or in multiple, by the operation of the master switches 60, the switch 60 being in the opposite position in truck B from that shown in truck A. As shown in Fig. 4 each truck is an independent unit and these trucks are coupled into a train by the car bodies D and E. It is intended that these trucks may be coupled for series or multiple operation with the adjacent motor trucks on either side of them and without regard to direction. That is, a motor truck may be uncoupled from a train going in one direction and coupled into a train going in the opposite direction without turning about on the track. This arrangement is secured by the uniform circuits and the uniform location of the wiring through the couplers insuring proper connections between the trucks under all conditions of operation. As will be noted, the order of the wires 48, 57, 53 and 76 between the couplers 50 is uniform throughout. For instance, the wires 48, 57, 53 and 76 are located in the same order relative to each other, between trucks A and B as between trucks B and C so that the truck C might be coupled to either side of truck A without changing the arrangement of the operating circuits.

It is necessary that the motor of a single truck may operate by itself. In this case the master switch 60 is placed in the central position as on truck C which isolates this truck from the adjacent trucks except for the block control. In this case magnet M of the master controller is energized from wire 51 through switch 54 and wire 55; and the motor is energized from wire 64 controlled by block relay 44, wire 67 controlled by the centrifuge, contact finger 68, motor 69, contact finger 71 and wire 56 to ground. This wiring is uniform with the wiring of trucks A and B and is similarly referenced. Truck C can be coupled for series or multiple operation with an adjacent truck by the proper manipulation of switch 60. It should be noted in the circuits described, that wire 56 is a grounded common wire, that is, it is grounded through the truck on the running rail and thus completes the return circuit to the generator 16.

Figure 2:
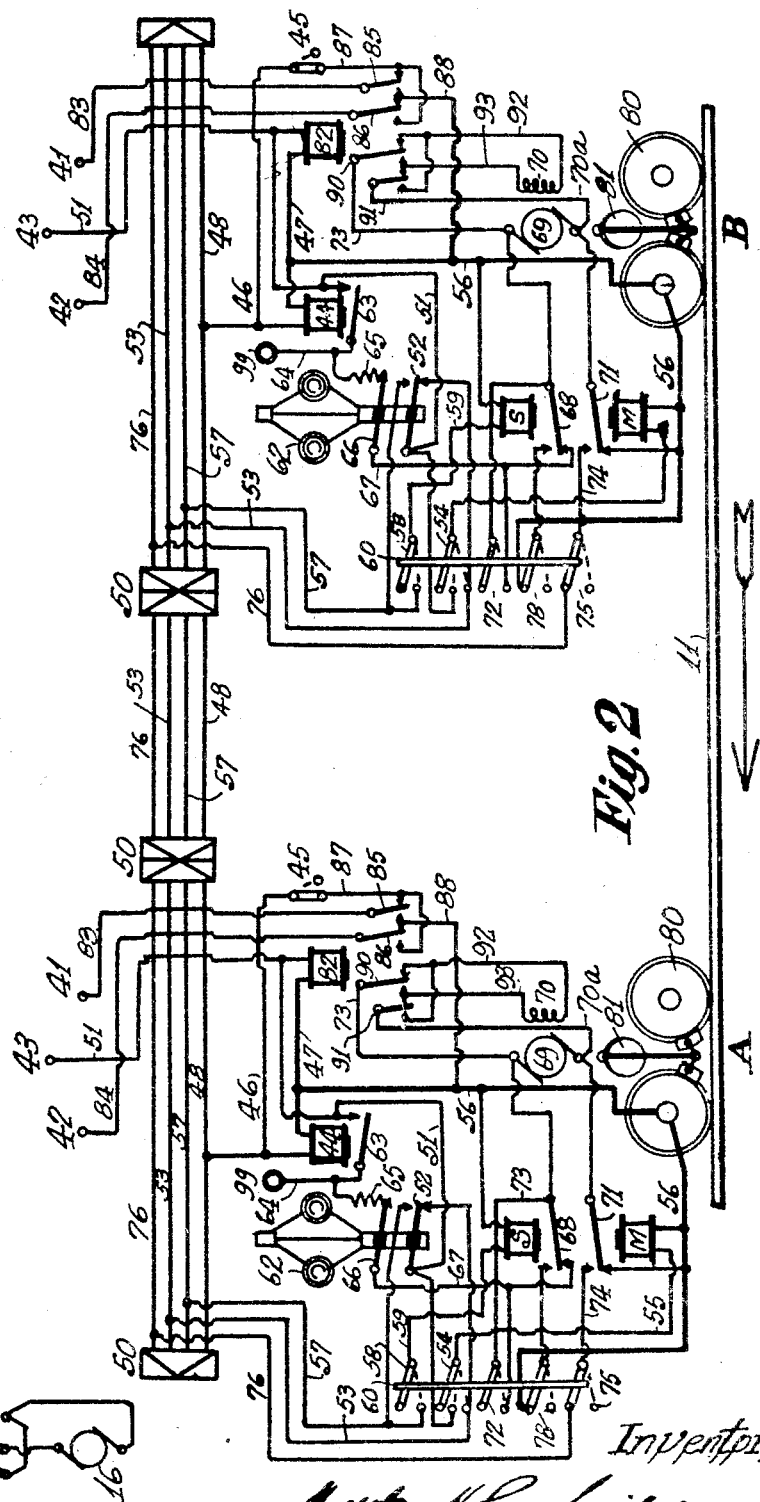
Fig. 2 is a wiring plan for a pair of trucks coupled together.

The arrangement described is embodied in the car wiring shown in Fig. 2 with the various parts similarly referenced and with some additional features included. A gravity braking system 81 operated by motor 69 is provided for trucks 80 as disclosed in my application, Serial No. 755,276, filed Sept. 2, 1924. A plug outlet 99 is provided on wire 64 from the block relay for supplying local current to the motors at a station stop where the power wire is omitted. In this case a cable connected with a current supply is plugged into 99 to move the cars to the position desired. The series-multiple control differs from Fig. 3 by reversing the position of wires 53 and 57 as controlled by finger 52 of the centrifuge; thus at low speeds multiple control is established and at high speeds series control is established, otherwise the operating circuits are the same in Figs. 2 and 3.

The series-multiple control system described has been illustrated in connection with trucks having one motor each which are suitably interconnected to obtain the control specified. It should be understood that the system is applied in a similar manner to trucks in which both motors are mounted on the same truck, as for instance where a motor is applied to each axle of a two axle truck in which case each axle is regarded as a separate truck in this specification.

The direction of running of each motor is determined by the relation of the current in the field winding 70 to the motor armature 69.

The direction of running of the car is remotely controlled as fully described in U. S. Patent 1,617,402, dated Feb. 15, 1927, by the pole changing switch 17 of the power supply 16 and the polarized relay 82 on each truck.

This relay is connected to the power wire 51 and is grounded on the truck by wires 47 and 56 and its armature responds to the polarity of the current in the power wire. The block wire 84 connects to contact finger 86 of this relay and block wire 83 connects to contact finger 85. In the position shown contact 85 connects to wire 87 and through switch 45 and wire 46 to relay 44, and contact 86 grounds on wires 88 and 56. When relay 82 is energized by reverse polarity, these contacts change position and wire 84 is connected to block relay 44 and wire 83 is grounded. This adjusts the block system for the established direction of running as described in U. S. Patent 1,617,402. For instance, the block system shown in Fig. 1 is intended for operation in both directions— that is, single track operation so that a truck may have its running direction changed by changing the position of switch 17 and the block system is operative to insure proper spacing of trains when running in either direction. Or again, a truck may be turned around on the track so that the relative positions of wires 83 and 84, Fig. 2 are changed about. It is apparent that the wire which is grounded on 88 and 56, grounds the block wire with which it connects. Thus, wire 84 is grounded as shown and shoe 42 is thereby grounded. If this shoe connects to wire 22 when moving from right to left, then wire 21 of the rear block is deenergized which causes the deenergizing of the block relay on a following train in the rear block and the stopping or retarding of this train.

If the truck is running in the opposite direction contact 85 grounds wire 83 and shoe 41 in contact with block wire 21 which thereby deenergizes block wire 22 for the rear block and stops or retards a train in this block by causing the block relay on this train to be deenergized.

Relay 82 controls the direction of running of the motor by controlling the direction of the current through the field 70. The brushes of motor 69, by wires 73 and 70a connect to the fingers 90 and 91 respectively of relay 82 and these fingers operate as a pole changer controlling the polarity of the current in wires 92 and 93 which supply the field 70 of the motor and thereby determines the direction of running of the motor. The direction of running of the motor is thus remotely controlled by relay 82.

This invention is capable of application in a variety of forms and with other types of trackway controls and is not to be limited to the specific embodiment selected to illustrate its working principles.

Having thus described my invention, I claim:

1. In an electric railway system as described, the combination, a track arranged for electric propulsion, a plurality of trucks coupled to form a train, each of said trucks embodying a motor unit and uniformly wired, a switch on each truck for connecting the motors of adjacent trucks to operate in series or in multiple and means on one truck controlled from the trackway for automatically controlling the operation of each of said motors.

2. In an electric railway system as described, the combination, a track arranged for electric propulsion, a plurality of trucks coupled to form a train, each of said trucks embodying a motor unit and uniformly wired, a switch on each truck co-operating with a switch on an adjacent truck for connecting the motors of said trucks to operate in series or in multiple and means on one truck controlled from the trackway for automatically controlling the operation of each of said motors.

3. In an electric railway system as described, the combination, a track arranged for electric propulsion, a plurality of trucks coupled to form a train, each of said trucks embodying a motor unit and uniformly wired, a switch on each truck for connecting the motor on the truck to operate by itself or to operate in series or in multiple with the motor of an adjacent truck and means on one truck controlled from the trackway for automatically controlling the operation of said motors when operating in series.

4. In an electric railway system as described, the combination, a track, a plurality of trucks coupled to form a train and each embodying a motor and a master controller, said master controllers arranged to control the motors of adjacent trucks in series or in multiple, automatic means for operating said master controllers and means controlled from the trackway controlling the operation of said master controller.

5. In an electric railway system as described, the combination, a track, a plurality of trucks coupled to form a train and each embodying a motor and a master controller, said master controllers arranged to control the motors of adjacent trucks in series or in multiple and means responsive to the speed of said trucks for operating said master controllers.

6. In an electric railway system as described, the combination, a track, a plurality of trucks coupled to form a train and each embodying a motor and a master controller, said master controllers arranged to control said motors in series or in multiple and means on one of said trucks responsive to speed for operating said master controllers.

7. In an electric railway system as described, the combination, a track, a motive unit on said track comprising a plurality of motors, means for connecting said motors for series or in multiple operation and a centrifuge for operating said means.

8. In an electric railway system as described, the combination, a track, a motive unit on said track comprising a plurality of motors, a master controller for connecting said motors for series or in multiple operation and means responsive to the speed of said unit for operating said master controller.

9. In an electric railway system as described, the combination, a track, a motive unit on said track comprising a plurality of motors, a device for connecting said motors for series or in multiple operation and means responsive to speed for operating said device and for controlling the current to said motors.

10. In an electric railway system as described, the combination, a track, a pair of trucks coupled to form a car and each embodying a motor, a master controller and a centrifuge, means for controlling said master controller by one centrifuge for both trucks and for controlling the current to each motor by the centrifuge located on the same truck as the motor.

11. In an electric railway system as described, the combination, a track, a plurality of trucks coupled to form a train and each embodying a motor, a master controller and a centrifuge, said master controller controlling said motors in series or in multiple and means whereby one centrifuge controls the current to said motors when operating in series.

12. In an electric railway system as described, the combination, a track, a plurality of trucks coupled to form a train and each embodying a motor, a master controller, a centrifuge and a block relay, said master controller controlling said motors, said centrifuge controlling said master controller and said relay controlling the current to said motors.

13. In an electric railway system as described, a track, a plurality of trucks coupled to form a train and each embodying a motor and a master controller, said master controller comprising a magnet which when energized connects the motors for series operation and another magnet which, when energized, connects the motors for multiple operation and automatically operated means on one of said trucks for selectively energizing said magnets.

14. In an electric railway system as described, the combination, a track with a power conductor and a block conductor, a truck with a motor on said track adapted for automatic operation by said power conductor, a relay on said truck controlled solely by said block conductor and controlling the power to said motor, and a centrifuge on said truck controlling the power to said motor and operating in response to the speed of said truck.

15. In an electric railway system as described, the combination, a track, a vehicle on said track having a plurality of electric propulsion motors mounted on separate trucks of the vehicle and automatically operated, means connecting said motors for series operation and a centrifuge responsive to the speed of said vehicle controlling the operation of all of said motors.

16. In a railway system as described, the combination, a track, a vehicle on said track propelled by an electric motor, an electrically operated master controller having a plurality of positions controlling the circuit of said motor and means on said vehicle selectively and automatically operating said master controller in accordance with the speed of the vehicle.

17. In a railway system, the combination, a track, a vehicle on said track propelled by an electric motor and capable of being coupled with similar vehicles on either side to form a train, a controlling switch on said vehicle controlling the circuit of said motor, said switch, when in one position, connecting said motor to operate only in series or in multiple with the motor of the vehicle ahead, and when in the reverse position connecting said motor to operate only in series or in multiple with the motor of the vehicle in the rear and means on the vehicle remotely controlled for controlling the running direction of said vehicle.

18. In a railway system, the combination, a track, a vehicle on said track propelled by an electric motor and capable of being coupled with similar vehicles on either side to form a train for operation in either direction, a controlling switch on said vehicle controlling the circuit of said motor, said switch, when in one position, connecting said motor to operate only in series or in multiple with the motor of the vehicle ahead, and when in the reverse position connecting said motor to operate only in series or in multiple with the motor of the vehicle in the rear and means for automatically operating said switch.

19. In a railway system, the combination, a track, a vehicle on said track propelled by an electric motor and capable of being coupled with similar vehicles on either side to form a train, a controlling switch on said vehicle controlling the circuit of said motor, said switch co-operating with similar switches on the vehicles on each side whereby the motors of a pair of adjoining vehicles may be operated in series or in multiple circuit and means for automatically operating said switch.

20. In a railway system, the combination, a track, a vehicle on said track propelled by an electric motor and capable of being coupled with similar vehicles on either side to form a train, a controlling switch on said vehicle controlling the circuit of said motor, said switch, when in one position, connecting said motor to operate in series or in multiple with the motor of the vehicle ahead, and when in the reverse position connecting said motor to operate in series or in multiple with the motor of the vehicle in the rear; and when in the neutral position controlling the circuit of said motor to operate by itself.

21. In a railway system, the combination, a track, a motive unit on said track comprising a plurality of electric motors, a controlling switch and a master controller controlling the circuits of said motors, said controlling switch selectively controlling said master controller to operate a pair of said motors in series or in multiple circuit and said controlling switch controlling one of said motors to operate by itself.

22. In a railway system, the combination, a track, a plurality of motive units on said track coupled to form a train, a power wire on said track, means on each of said motive units connecting with said power wire for supplying power to said units, a relay in each unit controlling said power supply, means connecting said relays in multiple circuit and means on the trackway, controlled by traffic conditions, controlling said relays.

23. In a railway system, the combination, a track, a plurality of motive units on said track coupled to form a train, a power wire on said track, means on each of said motive units connecting with said power wire for supplying power to said units, a relay in each unit controlling said power supply, and means on the trackway additional to said power wire operating through the leading vehicle and continuously controlling said relays as the train moves along the track.

24. In an electric railway system, the combination, a track, a plurality of motive units on said track coupled to form a train, a braking system associated with each of said units, a power wire on said track, means on each of said motive units connecting with said power wire for supplying power to said units, and a relay on each unit controlling the power supply to said units and controlling said braking system and means for continuously controlling said relays from the trackway as the train moves along the track.

25. In an electric railway system, the combination, a track, a plurality of motive units on said track coupled to form a train, a braking system associated with each of said units, a power wire on said track, means on each of said motive units connecting with said power wire for supplying power to said units, and a relay on each unit controlling the power supply to said units and controlling said braking system, said relays being controlled simultaneously and continuously throughout the train as the train moves along the track.

26. In an electric railway system, the combination, a track, a motive unit on said track comprising a plurality of motors, a master controller for connecting said motors for series or multiple operation, means responsive to the speed of said unit for operating said master controller and remotely controlled means for operating said vehicle in either direction.

27. In an electric railway system, the combination, a track, a motive unit on said track comprising a plurality of motors, means for connecting said motors for series or for multiple operation, automatic means for operating said connecting means and remotely controlled means for operating said vehicle in either direction.

28. In an electric railway system, the combination, a track, a vehicle on said track having a plurality of electric propulsion motors arranged for automatic operation, a centrifuge controlling the operation of said motors and means on said vehicle for operating said vehicle in either direction and remotely located means for operating said vehicle means.

29. In an electric railway system, the combination, a track, a vehicle on said track propelled by an electric motor, means on said vehicle controlled from the trackway for automatically stopping and starting said motor, means on the vehicle exclusively responsive to its speed controlling the circuit of said motor and remotely controlled means for operating said vehicle in either direction.

30. In an electric railway system, the combination, a track, a vehicle on said track propelled by an electric motor, a relay on said vehicle controlled from the trackway and a centrifuge controlled by the speed of the vehicle cooperatively controlling the circuit of said motor and remotely controlled means for operating said vehicle in either direction.

31. In a railway system, the combination, a track, a vehicle on said track propelled by an electric motor and capable of being coupled with similar vehicles on either side to form a train for operation in either direction, a controlling switch on said vehicle controlling the circuit of said motor to operate cooperatively with the motors of the coupled vehicles, remotely controlled means for operating said vehicles in either direction and means on the train controlled by traffic conditions controlling the circuit of said motors.

32. In a railway system, the combination, a track, a vehicle on said track propelled by an electric motor and capable of being coupled with similar vehicles on either side to form a train, a controlling switch on said vehicle controlling the circuit of said motor, said switch co-operating with similar switches on the vehicles on each side whereby the motors of a pair of adjoining vehicles may be operated in series or in multiple circuit, remotely controlled means for operating said vehicles in either direction and means on the train controlled by traffic conditions controlling the circuit of said motor.

33. In a railway system, the combination, a track, a motive unit on said track comprising a plurality of electric motors, a controlling switch and a master controller co-operatively controlling the circuits of a pair of said motors in series and in multiple, means on said motive unit for operating said motors in either direction and means on the trackway for controlling said means.

34. In a railway system, the combination, a track, a plurality of motive units on said track coupled to form a train, a power wire on said track, means on each of said motive units connecting with said power wire for supplying power to said units, a relay in each unit controlling said power supply, means for automatically controlling said relays simultaneously according to traffic conditions and automatically controlled means on said train for controlling the direction of movement of said train.

35. In an electric railway system, the combination, a track, a plurality of motive units on said track coupled to form a train, a braking system associated with each of said units, means for automatically controlling the power supply to each of said units and for controlling said braking system and remotely controlled means on said train for operating said units in either direction.

In testimony whereof I affix my signature.

MATTHEW H. LOUGHRIDGE.